(12) United States Patent
Loschiavo (10) Patent No.: US 12,148,405 B2
(45) Date of Patent: Nov. 19, 2024

(54) ELECTROMAGNETIC MULTI-FUNCTION MULTI-PURPOSE CHORDOPHONE

(71) Applicant: Joseph P. Loschiavo, Medford, NY (US)

(72) Inventor: Joseph P. Loschiavo, Medford, NY (US)

(73) Assignee: Joseph P. Loschiavo, Medford, NY (US)

( * ) Notice: Subject to any disclaimer, the term of this patent is extended or adjusted under 35 U.S.C. 154(b) by 1001 days.

(21) Appl. No.: 16/930,707

(22) PCT Filed: Jan. 17, 2018

(86) PCT No.: PCT/US2018/014102
§ 371 (c)(1),
(2) Date: Jul. 16, 2020

(87) PCT Pub. No.: WO2019/143329
PCT Pub. Date: Jul. 25, 2019

(65) Prior Publication Data
US 2020/0410971 A1    Dec. 31, 2020

(51) Int. Cl.
*G10D 3/12*    (2020.01)
*G01H 17/00*    (2006.01)
(Continued)

(52) U.S. Cl.
CPC .............. *G10D 3/12* (2013.01); *G01H 17/00* (2013.01); *G10D 1/04* (2013.01); *G10D 3/10* (2013.01);
(Continued)

(58) Field of Classification Search
CPC ............ G10D 3/12; G10D 3/153; G10D 1/04; G10D 3/10; G01H 17/00; G10H 3/188; G10H 2220/461
(Continued)

(56) References Cited

U.S. PATENT DOCUMENTS 1,010,477 A * 12/1911 Clark ................. G10D 1/04
                                                 84/264
2,137,160 A * 11/1938 Franklin ............. G10D 1/04
                                                 984/104
(Continued)

FOREIGN PATENT DOCUMENTS

DE    102007014928 A1 * 9/2008 ............... G10D 1/00
EP          1705639 A1 * 9/2006 ............... G10D 3/06
(Continued)

*Primary Examiner* — Christina M Schreiber
(74) *Attorney, Agent, or Firm* — Sorell, Lenna & Schmidt, LLP (57) ABSTRACT

An electromagnetic multi-function multi-purpose chordophone musical instrument upon which any form or style of music may be played in any position by a performer standing or seated, in a fixed location or moving throughout a performance venue. The player may initiating the vibrations of each string, any combination of strings, or all of the strings with a plectrum or the fingers of one or both hands, singly or in any combination and such vibrations will continue until their eventual natural termination unless damped and/or muted by the player using the fingers or the palm of one or both hands singly or in any combination. The shape and style of the rigid frame of the instrument is not limited by the need for frets, a fretboard, or keys.

20 Claims, 7 Drawing Sheets

(51) Int. Cl.
*G10D 1/04* (2020.01)
*G10D 3/10* (2006.01)
*G10D 3/153* (2020.01)
*G10H 3/18* (2006.01)

(52) U.S. Cl.
CPC ............. *G10D 3/153* (2020.02); *G10H 3/188* (2013.01); *G10H 2220/461* (2013.01)

(58) Field of Classification Search
USPC ......................................................... 84/726
See application file for complete search history.

(56) References Cited

U.S. PATENT DOCUMENTS

| | | | | |
|---|---|---|---|---|
| 4,408,513 A * | 10/1983 | Clevinger | ............. | G10H 3/182 984/369 |
| 4,472,994 A * | 9/1984 | Armstrong | ............. | G10H 3/183 84/743 |
| 4,499,809 A * | 2/1985 | Clevinger | ............. | G10H 3/182 984/369 |
| 4,696,217 A * | 9/1987 | MacWilliams | .......... | G10D 1/04 84/266 |
| 4,744,280 A * | 5/1988 | Garritano | ................ | G10D 3/22 84/726 |
| 4,915,009 A * | 4/1990 | Kunstadt | .................. | G10H 3/18 984/367 |
| 5,010,802 A * | 4/1991 | Lanham | .................... | G10H 3/18 84/743 |
| 5,085,115 A * | 2/1992 | Schlink | .................... | G10H 1/32 84/310 |
| 5,811,704 A * | 9/1998 | Anderko | ................. | G09B 15/06 84/291 |
| 5,949,006 A * | 9/1999 | Hechler | .................... | G10D 3/02 84/290 |
| 6,111,186 A * | 8/2000 | Krozack | ................. | G10H 3/186 84/736 |
| 6,127,615 A * | 10/2000 | Rosenberg | ............. | G09B 15/06 84/267 |
| 6,777,608 B1 * | 8/2004 | Redding | ................ | G10H 1/342 84/746 |
| 6,803,512 B2 * | 10/2004 | Ishida | ................... | G10H 1/0016 84/464 A |
| 7,211,719 B2 * | 5/2007 | Blake | ..................... | G10D 1/085 84/290 |
| 7,309,829 B1 * | 12/2007 | Ludwig | .................... | G10H 1/00 84/610 |
| 7,446,248 B2 * | 11/2008 | Skinn | ..................... | G10D 3/147 84/312 R |
| 7,534,954 B1 * | 5/2009 | Cassista | ................. | G10H 3/185 84/730 |
| 7,825,311 B1 * | 11/2010 | Williams | ............... | G10H 1/342 84/236 |
| 8,035,025 B1 * | 10/2011 | Donnell | .................... | G10H 3/18 84/723 |
| 8,476,512 B1 * | 7/2013 | Corfe | ........................ | G10D 1/04 84/293 |
| 9,564,109 B2 * | 2/2017 | Boxberger, Jr. | ........ | G10D 1/085 |
| 9,601,100 B1 * | 3/2017 | Dixon | .................... | G10H 3/182 |
| 2003/0164080 A1 * | 9/2003 | Childress | ............... | G10D 3/095 84/291 |
| 2005/0223873 A1 * | 10/2005 | Chen | ........................ | G10D 3/00 84/327 |
| 2006/0011048 A1 * | 1/2006 | Koster | ..................... | G10H 3/18 84/723 |
| 2006/0037459 A1 * | 2/2006 | Skinn | ....................... | G10G 7/02 84/312 R |
| 2006/0213358 A1 * | 9/2006 | Motsenbocker | ........ | G10H 3/185 84/731 |
| 2007/0084335 A1 * | 4/2007 | Silzel | ..................... | G10H 3/146 84/723 |
| 2008/0134859 A1 * | 6/2008 | Shelton | .................. | G10D 1/085 84/267 |
| 2011/0185877 A1 * | 8/2011 | Ahn | ........................ | G10D 1/08 84/291 |
| 2012/0198982 A1 * | 8/2012 | Roman | .................... | G10D 3/10 84/297 S |
| 2020/0302900 A1 * | 9/2020 | Scott | ...................... | G10D 3/147 |
| 2020/0365120 A1 * | 11/2020 | Warner | ................... | G10D 1/02 |
| 2020/0410971 A1 * | 12/2020 | Loschiavo | ............. | G10D 1/085 |
| 2021/0304719 A1 * | 9/2021 | Perry | ...................... | G10H 1/46 |

FOREIGN PATENT DOCUMENTS

| | | | | |
|---|---|---|---|---|
| EP | 4006895 A1 * | 6/2022 | ............. | G10D 1/08 |
| EP | 4036907 A1 * | 8/2022 | ............ | G10H 3/185 |
| JP | 2000338963 A | * 12/2000 | | |
| JP | 3385518 B2 | * 3/2003 | | |
| KR | 20230023414 A | * 2/2023 | | |

* cited by examiner

ELECTROMAGNETIC MULTI-FUNCTION MULTI-PURPOSE CHORDOPHONE

BACKGROUND OF THE INVENTION

TAn electromagnetic multi-function multi-purpose chordophone musical instrument upon which any form or style of music may be played in any position from vertical to horizontal, with the performer standing or seated in a fixed location or moving throughout a performance venue, comprising a plurality of strings stretched upon a rigid frame between the solid body element and tuning machine element of said rigid frame

BRIEF SUMMARY OF THE INVENTION

The following discussion is intended to facilitate an understanding of the present invention only. This discussion is not an acknowledgement or admission that any of the material referred to is or was part of the common general knowledge at the priority date of the application and there is no background art known to the applicant which may be useful for understanding the invention/innovations.

As music has developed over the centuries, chordophones such as guitars, mandolins, harps, pianos, and harpsichords, which initiate the vibrations of strings with a plectrum or by some other percussive means have been generally unable to produce a sustained sound or musical note which will not diminish quickly in volume after the sound is initiated.

The present invention overcomes that limitation and other limitations of such instruments and thereby allows a performer greater opportunities to display their skills and give effect to their musical talent and ideas.

Still other desirable features of the invention will become apparent to persons of ordinary skill in the art upon reading and understanding the following detailed description, taken with the accompanying drawings.

DETAILED DESCRIPTION OF THE INVENTION

The present invention will now be described with reference to the accompanying figures. It is to be understood that the specific system illustrated in the attached figures and described in the following specification is simply an exemplary embodiment of the present invention and is not to be construed as limiting the invention in any manner.

In all embodiments of the invention, a plurality of strings are stretched upon a rigid frame comprising a solid body element and a tuning machine element.

In all embodiments of the invention the vibrations of each string, any combination of strings, or all of the strings are initiated with a plectrum or the fingers of one or both hands of the player singly or in any combination.

In all embodiments of the invention, the vibrations of each string, any combination of strings, or all of the strings may be damped and/or muted at any time by the player using the fingers of one or both hands singly or in any combination, or the palm of either or both hands.

In all embodiments of the invention, unless damped and/or muted by the player, the sound of each string, any combination of strings, or all of the strings will continue until the eventual natural termination of the vibrations.

In all embodiments of the invention, the acoustic waveform of each vibrating string depends upon the scale length of the string, the tension upon the string, and the solid body of the instrument.

The present invention has some of the characteristics of a guitar or mandolin, but the invention differs significantly from those instruments because each of the strings vibrate freely in the open air space between the body of the instrument and tuning machine elements of the rigid frame without need for frets and/or a fretboard.

The present invention has some of the characteristics of an electric guitar or electric bass in having a solid body, but it differs significantly from those instruments by the effect the solid body of the instrument has upon the overtone series of each vibrating string.

The present invention has some of the characteristics of an electric guitar or electric bass or other stringed instruments which may also utilize transducers, because the string spacing of the present invention facilitates plucking or striking with a plectrum, or the fingers of one or both hands singly or in any combination, or one or both hands.

In all embodiments of the invention, the instrument may be played in a percussive manner using a plectrum, or the fingers of one or both hands singly or in any combination, or one or both hands, to produce an action and sound similar to that of a piano or harpsichord but without the need for any kind of keyboard or other mechanism in order to initiate vibrations in a single string, or any combination of strings, or all the strings of a plurality of strings.

The present invention has some of the characteristics of a piano or harpsichord, but differs significantly from those instruments by the manner in which the instrument is played, the means by which the strings are made to vibrate, the effect of the solid body of the instrument upon the overtone series of each vibrating string, use of a sensor to acquire the acoustic output of each freely vibrating string, and a transducer to convert the output of said sensor to an electromagnetic waveform.

All embodiments of the invention facilitate the playing of a single melodic line of music from individual strings while permitting the player to sustain the vibration of any note from any string in that melodic line for the entire duration of its vibration period without the need for any kind of artificial reverberation or sustaining device or system.

In all embodiments of the invention, the player may mute or stop the vibration of any string, or any combination of strings, or all the strings at any time by the use of a finger or fingers of one or both hands singly or in any combination, or the palm of one or both hands, or any combination thereof.

In all embodiments of the invention, the instrument can be played in a harmonic manner to produce chords or other combinations of tones by the vibration of multiple strings whether vibrating from the direct action of the player or sympathetically in response to one or more other vibrating strings.

In all embodiments of the invention, the vibrations of any single string, or any combination of strings, or all of the strings will be sustained freely and resonate after the vibrations are initiated up to the duration of the entire natural period of vibration in air for each string until damped, stopped, or muted by the player.

In all embodiments of the invention, the manner in which the string vibrates can be modified by mechanical devices such as a vibrato arm.

In all embodiments of the invention, the instrument may be held by the player and played in a variety of positions from vertical to horizontal, or played lying flat on a supporting surface, or played in any position on a stand accommodating the rigid frame of the instrument.

In all embodiments of the invention, the performer may play the instrument standing, seated, or in any other posture the performer wishes to assume.

In all embodiments of the invention, the player may move freely throughout a performance venue without any limitations imposed by the instrument.

In all embodiments of the invention, the rigid frame may be in any shape which can accommodate the tension created by the strings when they are properly tuned and allow said strings to vibrate freely.

Figure 1:
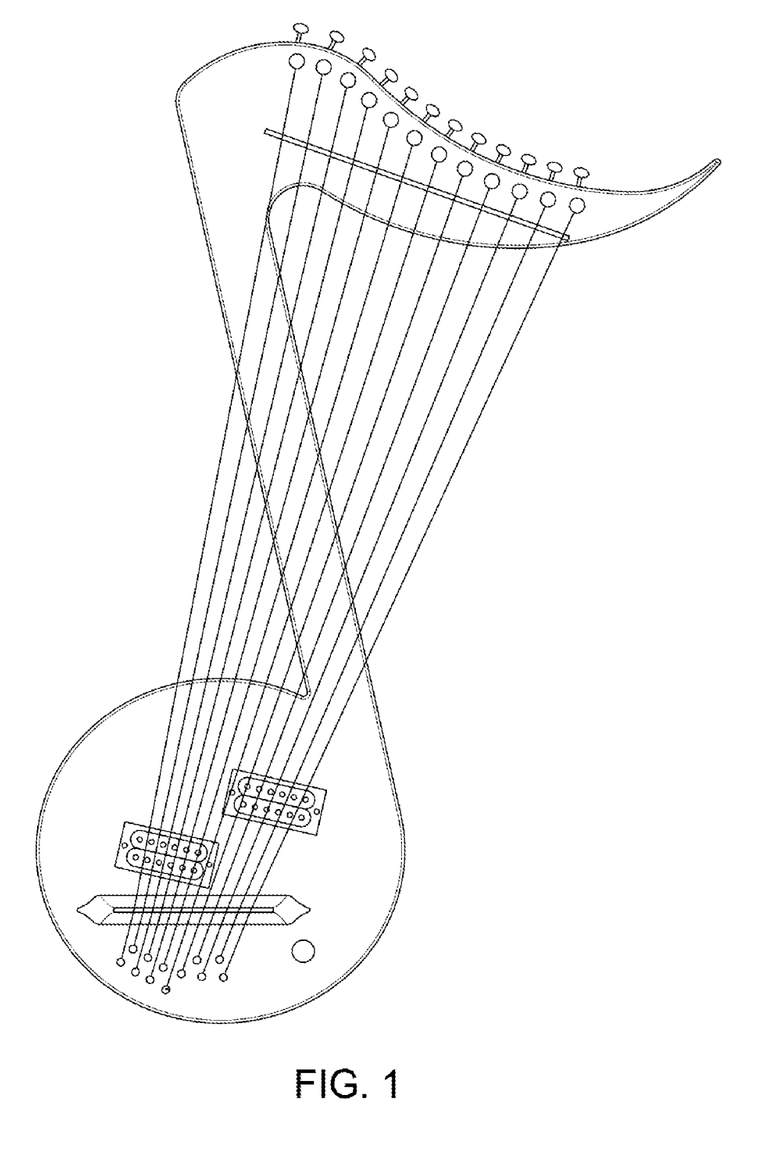
FIG. 1 is a side view of the exemplary embodiment of the invention in the shape of a flagged eighth note showing the solid body of the instrument, the electromagnetic transducers, 12 strings free to vibrate in the air, and the 5 fixed version of the headstock and tuning machine.
Figure 2:
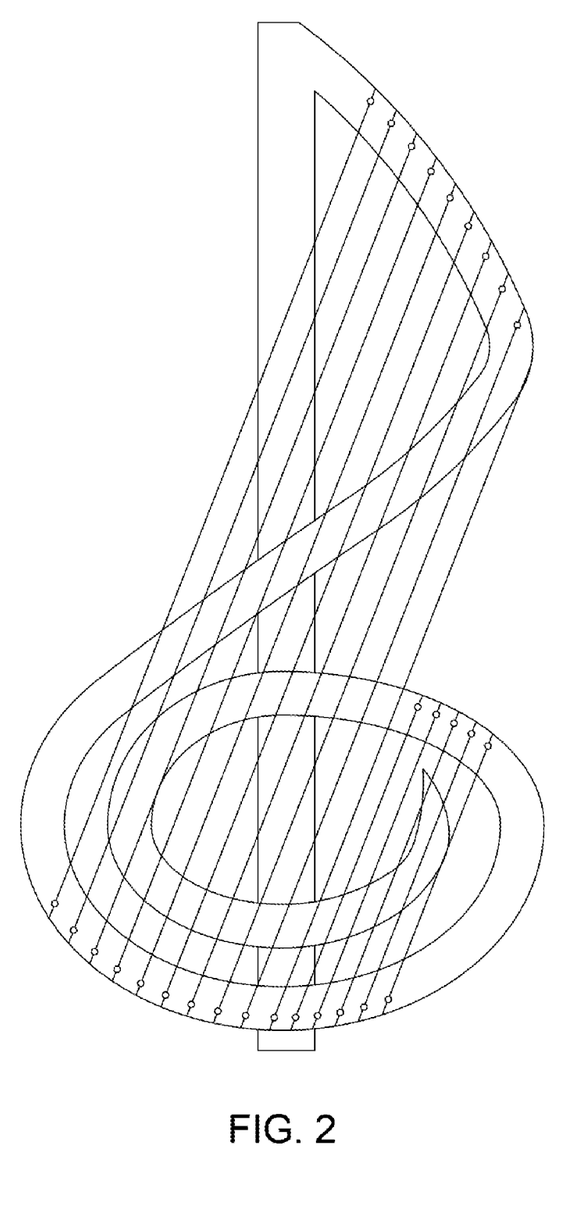
FIG. 2 is a drawing in another embodiment of the invention in the shape of treble or G-clef.
Figure 3:
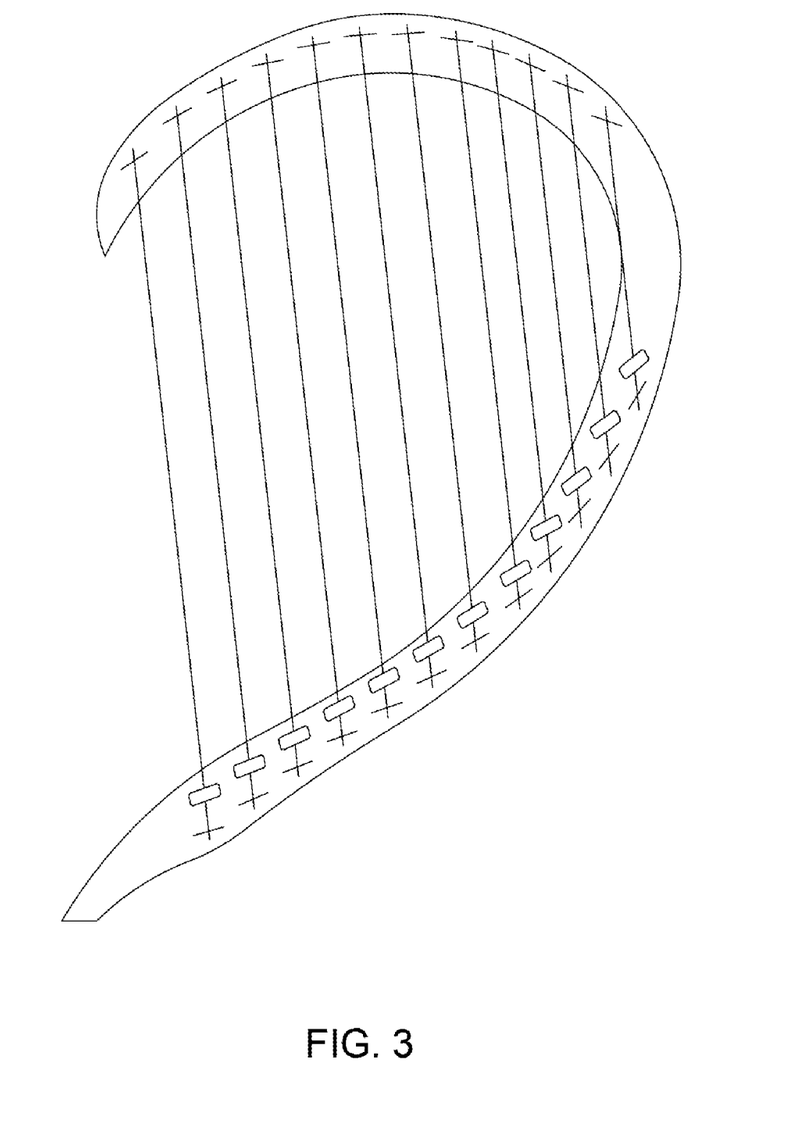
FIG. 3 is a drawing of another embodiment of the invention in the shape of a bass or F-clef.

In the exemplary embodiment of the invention in which the rigid frame is in the shape of a flagged eighth note (FIG. 1), a truss rod representing the neck of the eighth note connects the solid body of the instrument with the headstock and tuning machines.

In all embodiments of the invention, the solid body element of the instrument may be any material.

In all embodiments of the invention, the material composition of the solid body of the instrument will affect the acoustic waveform of each vibrating string.

In all embodiments of the invention, the shape of the rigid frame and the means of attaching the strings to the body of the instrument and attaching said strings to the tuning machine allows strings of variable scale length to vibrate freely.

Figure 4:
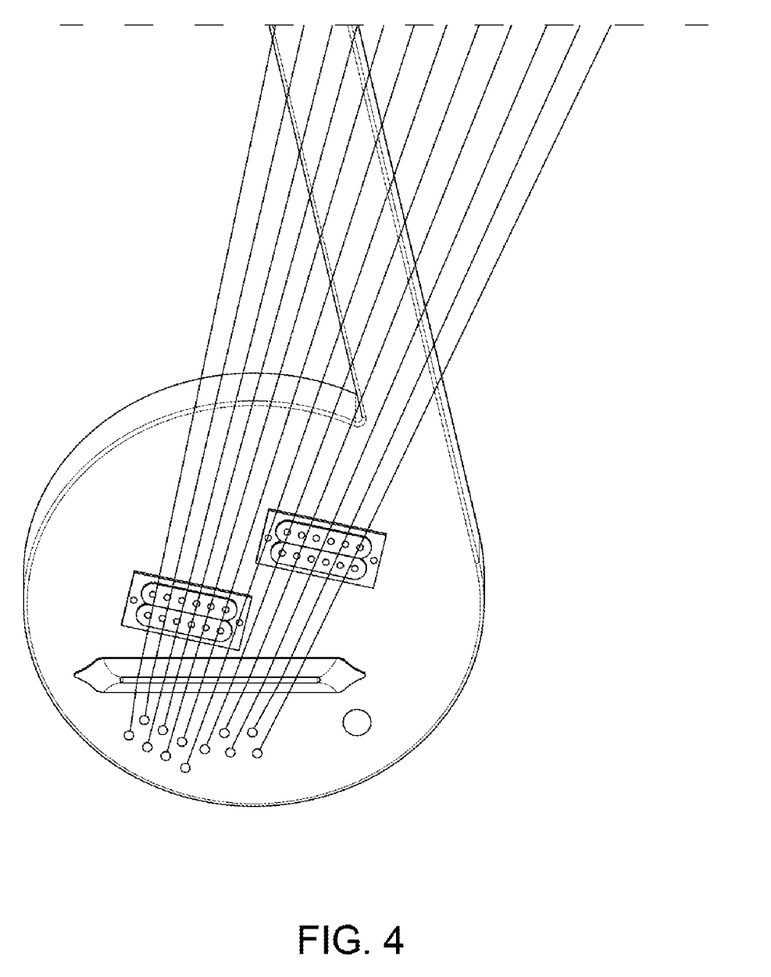
FIG. 4 is a side view of the exemplary embodiment of the invention in the shape of a flagged eighth note showing the manner in which each individual string is raised from the body of the instrument as it passes from its anchor point in the solid body of the instrument and over the electromagnetic transducers by a fixed bridge mounted upon the solid body of the instrument.
Figure 5:
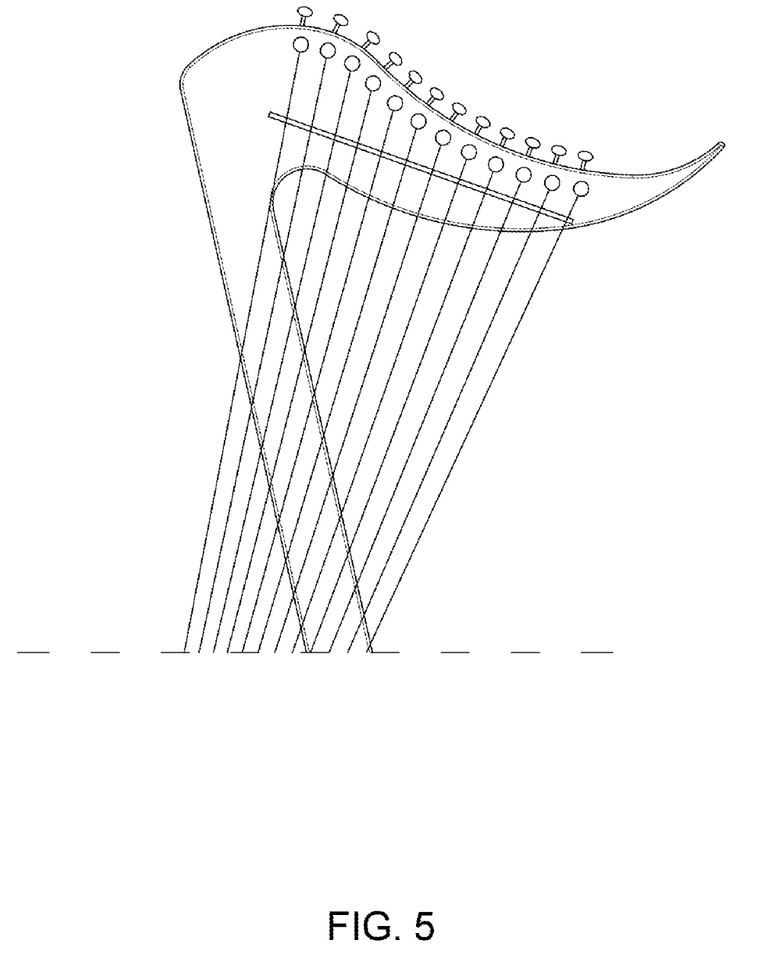
FIG. 5 is a side view of the exemplary embodiment of the invention showing the fixed nut version of the headstock and tuning machine.

In all embodiments of the invention, a bridge mounted upon the solid body of the instrument raises each individual string sufficiently from the body of the instrument as it passes from its anchor point in or upon the solid body of the instrument (FIG. 4) to the tuning machine of the instrument whereby each said string may vibrate freely over the entire distance from said bridge to the nut.

In all embodiments of the invention, an adjustable nut permits the player to set the scale length of any single string, or any combination of strings, or all of the strings.

In all embodiments of the invention, the tuning machines permit the tension on each individual string to be varied sufficiently to permit a variety of tunings.

In all embodiments of the invention, the acoustic waveform of each vibrating string is acquired by a sensor and converted to an electromagnetic waveform by a transducer.

In all embodiments of the invention, each string is an independent tone generator which permits the player to interact with and modify the electromagnetic waveform from the transducer associated with each said string.

Figure 6:
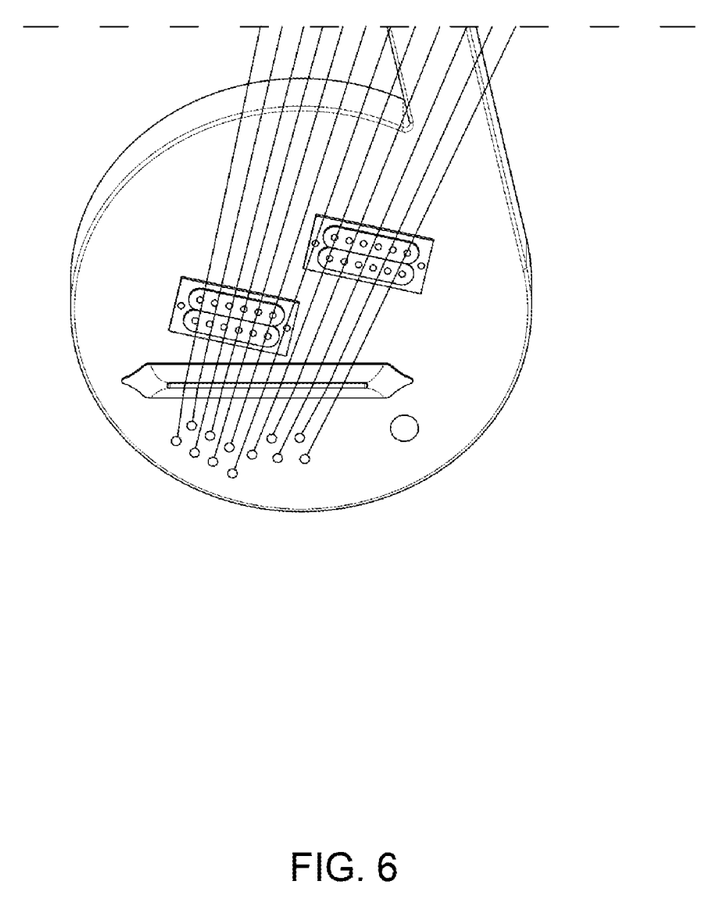
FIG. 6 is a side view of the exemplary embodiment of the invention showing 12 independent electromagnetic transducers in two groups of six located beneath each string and set in the solid body of the instrument as an 20 integral part of such body beneath each string separated from the string by a sufficient distance to allow the string to vibrate freely.
Figure 7:
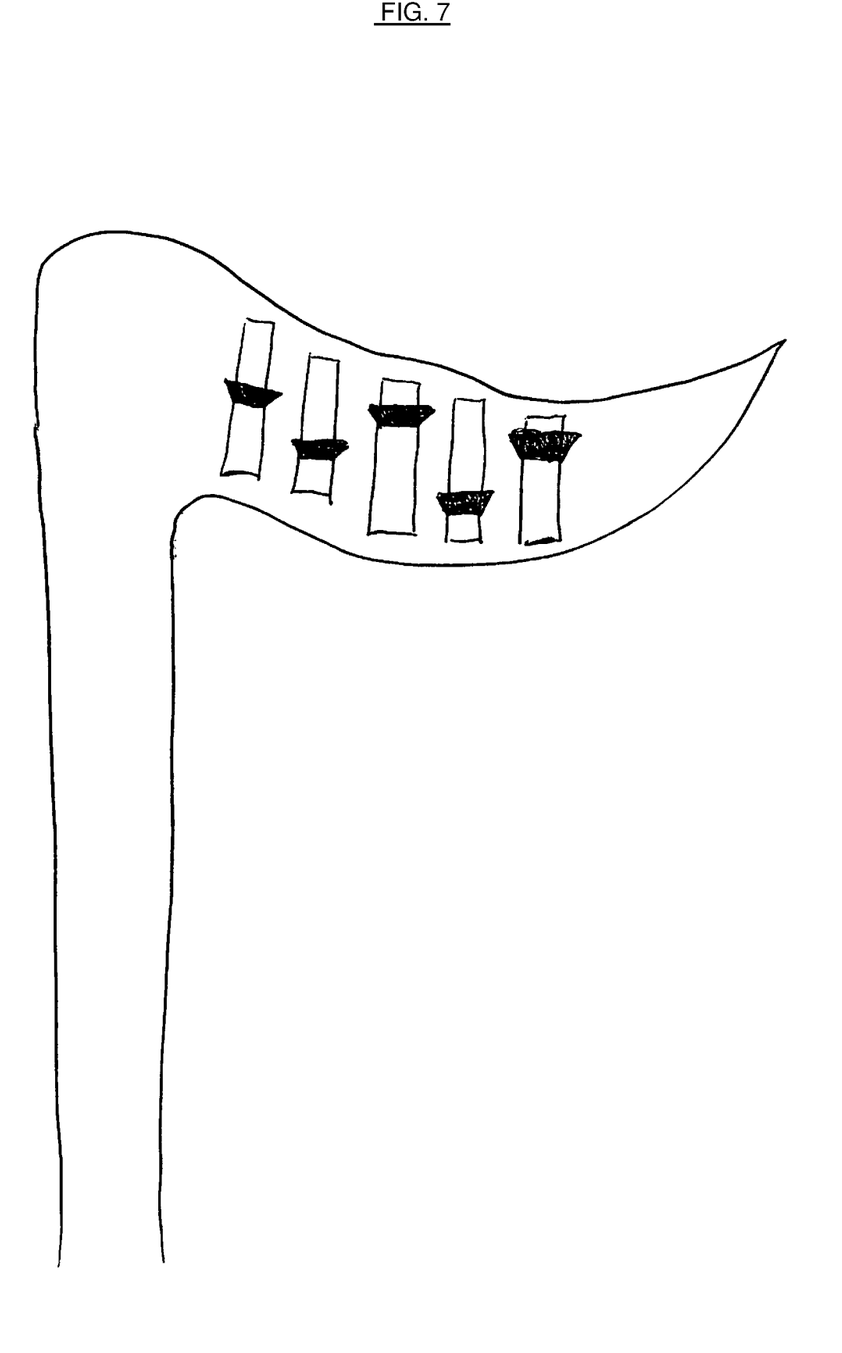
FIG. 7 is a side view of one embodiment of a musical instrument in accordance with the principles of the present disclosure.

In all embodiments of the invention, the transducer is separated from each string by a sufficient distance to allow said string to vibrate freely (FIG. 6).

In all embodiments of the invention, the frequency or pitch of the output signal from each said transducer may be modified manually by the player or by a computer program in real time or at some later time.

In all embodiments of the invention, the output of each said transducer may be transmitted for further signal processing by any means well known to a person having ordinary skill in the art.

In all embodiments of the invention, the output signal from each said transducer connects to one or more devices wherein said output signal may be amplified, and/or modified and/or reproduced, and/or recorded.

In all embodiments of the invention, the player may select the signal output of any transducer associated with a single string, or any combination of strings, or all of the strings and process the signal from each of said transducers independently of the processing applied to the signal output from any other transducer associated with any other string and transmit such signal by wired or wireless means and/or by means of a MIDI interface to one or more signal processing devices.

In all embodiments of the invention, the player may combine the output signal from any single transducer, or any combination of transducers, or all of the transducers to create a composite output signal and said composite output signal may be transmitted to any signal processing device directly by wired or wireless means and/or by means of a MIDI interface.

The invention has been described with reference to the desired embodiment. Obvious modifications and alterations will occur to others upon reading and understanding the preceding detailed description. It is intended that the invention be construed as comprising all such modifications and alterations insofar as they come within the scope of the appended claims or the equivalents thereof.

I claim:

1. A musical instrument comprising:
   a frame comprising a base, a headstock and a neck, the base comprising opposite first and second ends and defining a longitudinal axis from the first end to the second end, the first end being connected to the neck, the headstock being connected to the neck, the neck extending at an acute angle relative to the longitudinal axis along an entire length of the neck, the headstock extending transverse to the neck, the base including a first transducer set and a second transducer set that is spaced apart from the first transducer set;
   a plurality of strings each having a different length and including a first end coupled to the base and an opposite second end coupled to the headstock such that the strings extend at an acute angle relative to the longitudinal axis, the strings each extending across the neck such that the first ends of the strings are directly coupled to the base, the strings including a first set of strings and a second set of strings, the first set of strings extending over the first transducer set and the second set of strings extending over the second transducer set, the first set of strings being spaced apart from the second transducer set and the second set of strings being spaced apart from the first transducer set; and a nut configured to adjust a scale length of one or more of the strings.

2. The musical instrument recited in claim 1, wherein adjusting the scale length of one or more of the strings changes an amount of tension on one or more of the strings.

3. The musical instrument recited in claim 1, wherein the transducers sets include electromagnetic transducers.

4. The musical instrument recited in claim 1, further comprising a sensor configured to acquire an acoustic output from each of the strings, the transducer sets being configured to convert each of the acoustic outputs to an electromagnetic waveform.

5. The musical instrument recited in claim 1, wherein the first transducer set is vertically offset relative to the second transducer.

6. The musical instrument recited in claim 1, wherein the first transducer set is vertically offset relative to the second transducer along an axis defined by one of the strings.

7. The musical instrument recited in claim 1, wherein the strings comprise twelve strings.

8. The musical instrument recited in claim 1, wherein the strings each include an intermediate portion between the first end and the second end, the musical instrument further comprising a bridge coupled to the base, the strings each extending over the bridge such that the intermediate portions are spaced apart from the base.

9. The musical instrument recited in claim 1, further comprising a vibrato arm configured to modify vibrations of the strings.

10. The musical instrument recited in claim 1, wherein the headstock has a maximum width that is greater than a maximum width of the base.

11. The musical instrument recited in claim 1, wherein the nut comprises a plurality of nuts, each of the nuts being coupled to one of the strings to adjust a scale length of a respective one of the strings.

12. The musical instrument recited in claim 1, wherein the strings each extend at an acute angle relative to one another.

13. The musical instrument recited in claim 1, wherein the musical instrument is free of frets and artificial reverberation devices and is configured to be played like a guitar such that the musical instrument is held off the ground.

14. A musical instrument comprising:
a frame comprising a base, a headstock and a neck, the base comprising opposite first and second ends and defining a longitudinal axis from the first end to the second end, the first end being connected to the neck, the headstock being connected to the neck, the neck extending at an acute angle relative to the longitudinal axis along an entire length of the neck, the headstock extending transverse to the neck, the base including a first transducer set and a second transducer set that is spaced apart from the first transducer set;

a plurality of spaced apart electrically conductive strings, the strings each having a different length and including a first end coupled to the base and an opposite second end coupled to the headstock such that the strings each extend at an acute angle relative to the longitudinal axis, the strings each extending across the neck such that the first ends of the strings are directly coupled to the base, the strings each including an intermediate portion between the first end and the second end, the strings comprising a first set of strings and a second set of strings;

spaced apart first and second transducer sets, the first transducer set being vertically offset relative to the second transducer the first set of strings extending over the first transducer set and the second set of strings extending over the second transducer set, the first set of strings being spaced apart from the second transducer set and the second set of strings being spaced apart from the first transducer set;

a sensor configured to acquire an acoustic output from each of the strings, the transducer sets being configured to convert each of the acoustic outputs to an electromagnetic waveform;

a plurality of nuts, each of the nuts being coupled to one of the strings to adjust a scale length of a respective one of the strings;

wherein adjusting the scale length of one or more of the strings changes an amount of tension on one or more of the strings.

15. The musical instrument recited in claim 14, wherein the strings each include an intermediate portion between the first end and the second end, the musical instrument further comprising a bridge coupled to the base, the strings each extending over the bridge such that the intermediate portions are spaced apart from the base.

16. The musical instrument recited in claim 14, further comprising a vibrato arm configured to modify vibrations of the strings.

17. The musical instrument recited in claim 14, wherein the strings each have a length defined by a distance from the first end to the second end, the lengths of the strings each being different.

18. The musical instrument recited in claim 14, wherein the musical instrument is free of frets and artificial reverberation devices.

19. A musical instrument comprising:
a frame comprising a base, a headstock and a neck, the base comprising opposite first and second ends and defining a longitudinal axis from the first end to the second end, the first end being connected to the neck, the headstock being connected to the neck, the neck extending at an acute angle relative to the longitudinal axis along an entire length of the neck, the headstock extending transverse to the neck, the headstock having a maximum width that is greater than a maximum width of the base, the base including a first transducer set and a second transducer set that is spaced apart from the first transducer set;

twelve spaced apart electrically conductive strings, the strings including a first set of strings and a second set of strings, the first set of strings extending over the first transducer set and the second set of strings extending over the second transducer set, the first set of strings being spaced apart from the second transducer set and the second set of strings being spaced apart from the first transducer set, the first transducer set being vertically offset relative to the second transducer along an axis defined by one of the strings, the strings each having a different length and including a first end coupled to the base and an opposite second end coupled to the headstock such that the strings each extend at an acute angle relative to the longitudinal axis and one another, the strings each extending across the neck such that the first ends of the strings are directly coupled to the base, the strings each including an intermediate portion between the first end and the second end;

a sensor configured to acquire an acoustic output from each of the strings, the transducer sets being configured to convert each of the acoustic outputs to an electromagnetic waveform;

a plurality of nuts, each of the nuts being coupled to one of the strings to adjust a scale length of a respective one of the strings, wherein adjusting the scale length of one or more of the strings changes an amount of tension on one or more of the strings.

20. The musical instrument recited in claim 19, wherein the musical instrument is free of any frets and artificial reverberation devices.

* * * * *